Jan. 10, 1928.
B. F. SAFBERG
METHOD OF MAKING ZIGZAG CONDUITS
Filed June 18, 1923
1,655,823
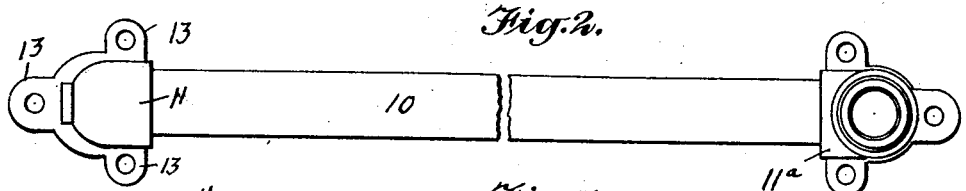
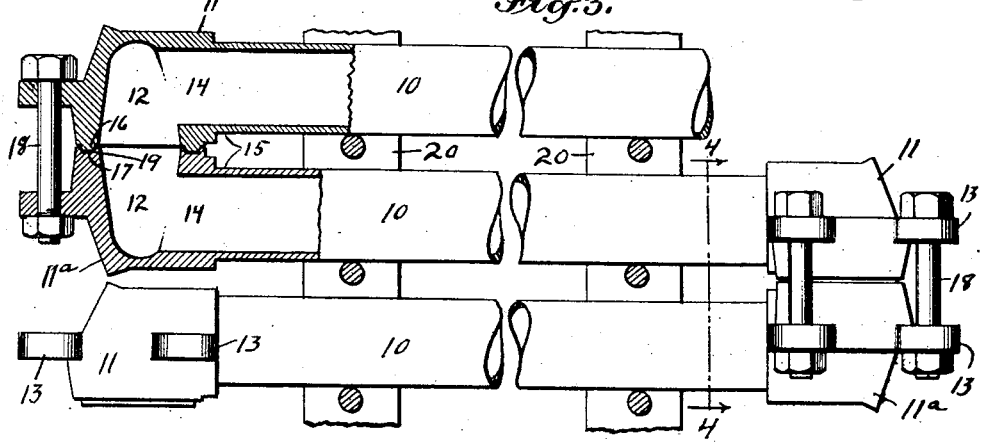
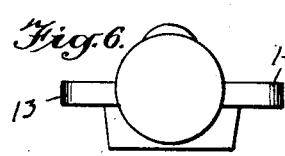
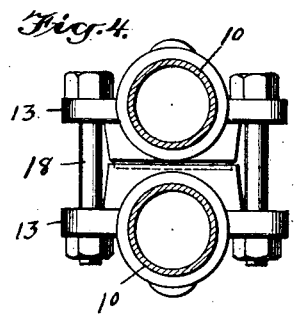
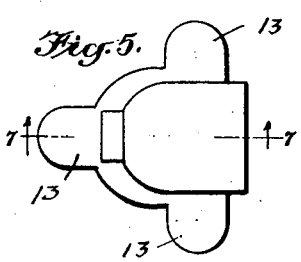
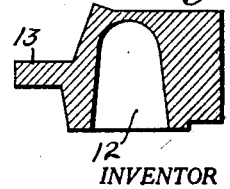
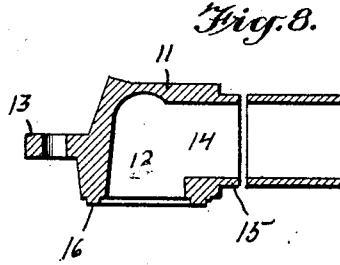
INVENTOR
Ben F. Safberg
BY
Dean Fairbank Obreght & Hirsch
ATTORNEYS Patented Jan. 10, 1928.

1,655,823

UNITED STATES PATENT OFFICE.

BROR F. SAFBERG, OF CARBONDALE, PENNSYLVANIA, ASSIGNOR TO CARBONDALE MACHINE COMPANY, OF CARBONDALE, PENNSYLVANIA, A CORPORATION OF PENNSYLVANIA.

METHOD OF MAKING ZIGZAG CONDUITS.

Application filed June 18, 1923. Serial No. 646,016.

This invention relates to that type of heat interchanger in which a series of pipe sections are connected by return bends to form the several runs of a zig-zag conduit for a fluid which is to be cooled or heated.

One object of my invention is to provide a unit of standard length and of such construction that the requisite number of such units may be connected in series to build up a zigzag conduit of any desired length, the terminal portions of the units being so formed that they may be easily and quickly coupled together at the place of use to form fluid-tight joints without the aid of special tools, material or skill.

The unit includes two drop forged fittings welded to a wrought steel pipe, the fittings being of practically the same material as the pipe and in the form of half bends or right angle turns, and the fitting at one end of the pipe having a male joint and that at the other end having a female joint, whereby the fittings of juxtaposed units will center and interengage when bolted or clamped together.

By means of my improved construction threaded joints are eliminated, which means the elimination of any chance of electrolytic action due to the possible action of cooling water on dissimilar metals in the joint, and the chance of corrosion which is always liable to start at the bottom of the exposed pipe threads. The strength of the pipe is not reduced by cutting threads into the wall, and the pipe in being connected to the fitting is not subjected to any torsional strain with the consequent chance of splitting the pipe at the weld, as is also the case with threaded joints.

I also eliminate another difficulty which is very prevalent with threaded joints, and that is leaks. There is no way at the present time, so far as I know, to make a threaded joint tight and be positively certain that it is tight, even though graphite or litharge be employed. Sweated joints are expensive and uncertain and make repairs or replacements almost impossible.

The fitting is practically unbreakable, as it is made of steel and the lugs cannot be pulled off in clamping the fittings together. The bolted flanges which connect the units are readily accessible and convenient in case of repairs. The entire conduit is of wrought steel construction throughout. The fittings and pipe having approximately the same physical properties, insure an efficient weld, and have the advantage of durability and strength. The fittings may have the same internal diameter as the inside of the pipe so that there are no shoulders which interfere with the free flow of the fluid or collect sediment or prevent complete drainage. As each pipe has its own fittings welded thereto and independent of any other pipe and its fittings, it will be apparent that the clamping faces may be disposed beyond the side of the pipe to any desired distance, depending on the design of the fitting, and therefore adjacent pipe sections may be as close together as desired and welding in the confined space between adjacent pipes is not required as in the case welding a U bend to the ends of two adjacent pipes. A large number of units may be made of the same length because the pipe section and fittings may be made of standard dimensions and the connection of the fittings to the pipe section will not involve the possibility of such variation in total length as results from screwing a fitting on to a threaded pipe. The entire unit can be galvanized after the welding of the fittings to the pipe, thus obtaining the maximum protection from the zinc coating.

There is the greatest ease of construction, as any desired number of units may be connected together and the greatest ease of repair, as any unit may be removed or replaced in a minimum of time and effort. Units may be carried in stock, providing a ready means of making repairs. Each unit being of a single piece, there is avoided all possibility of leakage except at the packing between adjacent fittings and this may be readily replaced or may be tightened, as required. The second-hand value of the coil built up of such units is greater than with the screwed type, because, if desired, the number of units in the coil can be readily changed or worn out sections may be removed and the good sections used to construct new coils.

In the accompanying drawings:

Fig. 1 is a central longitudinal section of a unit embodying my invention.

Fig. 2 is a top plan view thereof.

Fig. 3 is a side elevation of a conduit built up of a plurality of units, a portion thereof being shown in section.

Fig. 4 is a section on the line 4—4 of Fig. 3.

Fig. 5 is a top plan view of the forging from which one of the fittings is made.

Fig. 6 is an end view of the forging shown in Fig. 5.

Fig. 7 is a section on the line 7—7 of Fig. 5, and

Fig. 8 is a section showing the finished fitting juxtaposed to the pipe ready for welding.

In my improved construction each unit includes a pipe section 10 having separate units 11 and 11$^a$ welded to the opposite ends thereof. The pipe section is preferably of wrought steel tubing, and the fittings are preferably drop forgings having the same general physical and chemical characteristics as the fittings. Although the two fittings may differ slightly when finished, they may be initially formed of identical shape, as shown in Figs. 5, 6 and 7. The fittings are forged with a recess or cavity 12 entering from one face thereof, and a plurality of lugs 13 projecting outwardly in a plane substantially at right angles to the general direction of the depth of the recess. In finishing the forgings an aperture 14 is drilled or bored through the wall of the forging so as to intersect the inner portion of the recess, the center line of the hole being substantially at right angles to the center line of the recess. This hole is made of the same internal diameter as that of the pipe 10 to which the forging when completed is to be welded. The face of the forging at the outer end of the hole 14 is machined to form an annular flange 15 of approximately the same external diameter as the pipe, and with a squared terminal face for abutting engagement with the pipe and direct welding to the latter. The face of the forging encircling the outer or open end of the recess 12 is finished in a plane at right angles to the axis of the hole 14, and so as to adapt it to proper fit with another and similar forging. Preferably the forging 11 which is attached to one end of the pipe 10 is machined to present a flange 16 and the forging 11$^a$ which is welded to the opposite end of the same pipe section is machined to present a groove 17 so that the two fittings may interengage to form a male and female joint. The two fittings are electrically welded to the ends of the pipe with the recesses 12 facing in opposite directions.

When it is desired to build up a conduit from a plurality of these units they may be assembled and the flanges or lugs 13 directly bolted together by bolts 18 extending through holes bored in said flanges or lugs. A gasket 19 may be employed in the grooves 17 if desired.

Each fitting constitutes a half bend, and the recess 12 and hole 14 form a right angle turn in the complete conduit. Any desired number of the units may be connected together, and each fitting may rest upon the one therebeneath or the pipes may be supported independently of the fittings by suitable lugs or flanges on standards 20.

Although preferably each forging is formed with the center line of its recess or cavity 12 at right angles to the plane of the lugs 13, yet it will be apparent that such recess might be formed in a plane parallel to that of the lugs so that in finishing the forgings and clamping them together the bored holes of two fittings would be in alignment and the recesses or cavities would be in alignment with the pipes. If it is desired to form a double tube counter-current apparatus holes may be bored in the opposite side of each fitting, in alignment with the hole 14, and through which the inner pipe may be extended.

Having thus described my invention, what I claim as new and desire to secure by Letters Patent is:

1. The method of making a unit for zigzag conduits, which consists in making two similar drop forgings each having a chamber therein, cutting a hole through the wall of each forging to intersect the inner portion of the chamber, machining the face of each forging encircling the outer end of the chamber to form a joint seat, welding said forgings to opposite ends of a pipe section of the same internal diameter as the holes cut in each forging, and with said holes in registry with the pipe and with the joint seats facing in opposite directions and upon opposite sides of the axis of the pipe.

2. The method of making a unit for zigzag conduits which consists in making two similar drop forgings each having a passage therethrough terminating in passage sections substantially at right angles to each other and welding said forgings to opposite ends of a wrought steel pipe section with the outer ends of the passage sections facing in opposite directions, the forging at one end presenting a male seat and the forging at the other end presenting a female seat, and the internal and external diameters of the passage section in alignment with the pipe being the same as the internal and external diameters as the pipe.

Signed at Carbondale, in the county of Lackawanna and State of Pennsylvania, this 14th day of June, A. D. 1923.

BROR F. SAFBERG.